US012572408B2

(12) United States Patent
Clas et al.

(10) Patent No.: US 12,572,408 B2
(45) Date of Patent: Mar. 10, 2026

(54) STORAGE DEVICE FAILURE VERIFICATION VIA KERNEL MESSAGE POLLING AND DEVICE DIAGNOSTIC DATA ANALYSIS

(71) Applicant: INTERNATIONAL BUSINESS MACHINES CORPORATION, Armonk, NY (US)

(72) Inventors: Patrick John Clas, Pine Plains, NY (US); Victor Manuel Martins Lourenco, Vestal, NY (US); David Walters, Manahawkin, NJ (US); Timothy V. Bolan, Endwell, NY (US); Ruben O Manso, Vestal, NY (US); Hien Nguyen, Camas, WA (US); Brian D Valentine, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 18/517,161

(22) Filed: Nov. 22, 2023

(65) Prior Publication Data

US 2025/0165331 A1     May 22, 2025

(51) Int. Cl.
*G06F 11/07* (2006.01)

(52) U.S. Cl.
CPC ........ *G06F 11/079* (2013.01); *G06F 11/0727* (2013.01)

(58) Field of Classification Search
CPC ............. G06F 11/0727; G06F 11/0757; G06F 11/076; G06F 11/0772; G06F 11/079
See application file for complete search history.

(56) References Cited

U.S. PATENT DOCUMENTS

| | | | |
|---|---|---|---|
| 6,982,842 B2 * | 1/2006 | Jing | G11B 20/1816 |
| 8,145,941 B2 | 3/2012 | Jacobson | |
| 9,239,746 B2 | 1/2016 | Fahimi et al. | |
| 9,710,317 B2 * | 7/2017 | Gupta | G06F 3/0688 |
| 10,896,080 B2 | 1/2021 | Wu et al. | |

FOREIGN PATENT DOCUMENTS

| | | |
|---|---|---|
| CN | 103197995 A | 7/2013 |
| CN | 111124785 A | 5/2020 |
| CN | 113656228 A | 11/2021 |

* cited by examiner

*Primary Examiner* — Joseph R Kudirka
(74) *Attorney, Agent, or Firm* — Onyx IP Group

(57) ABSTRACT

A storage device failure verification method may include receiving a message from an operating system indicative of an operational failure associated with a storage device. The method may further include determining, responsive to receiving the message from the operating system, whether one or more corrupted sectors are reported by the storage device based upon device diagnostic data received from the storage device. The method may further include determining, responsive to determining that no corrupted sectors are reported by the storage device, a timing value between storage device errors associated with the storage device during a predetermined time window. The method may further include sending a notification indicative of a failure of the storage device based on the timing value being less than a predetermined threshold value.

20 Claims, 6 Drawing Sheets

500

100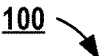

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

STORAGE DEVICE FAILUTRE
VERIFICATION  COMPONENT

107

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

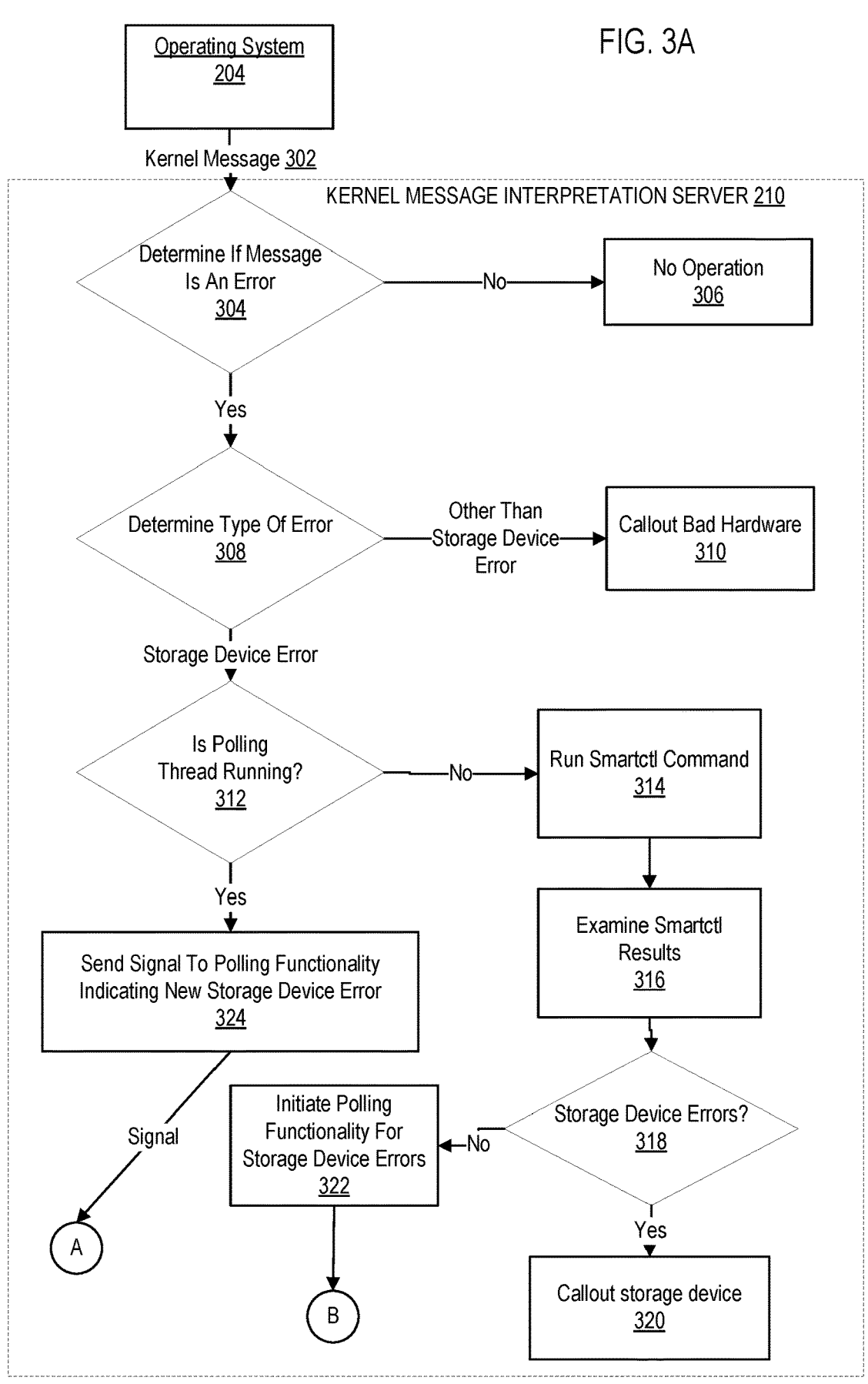

Operating System
204

Kernel Message 302

KERNEL MESSAGE INTERPRETATION SERVER 210

Determine If Message
Is An Error
304

No

No Operation
306

Yes

Determine Type Of Error
308

Other Than
Storage Device
Error

Callout Bad Hardware
310

Storage Device Error

Is Polling
Thread Running?
312

No

Run Smartctl Command
314

Yes

Examine Smartctl
Results
316

Send Signal To Polling Functionality
Indicating New Storage Device Error
324

Signal

Initiate Polling
Functionality For
Storage Device Errors
322

No

Storage Device Errors?
318

Yes

A

B

Callout storage device
320

FIG. 3B

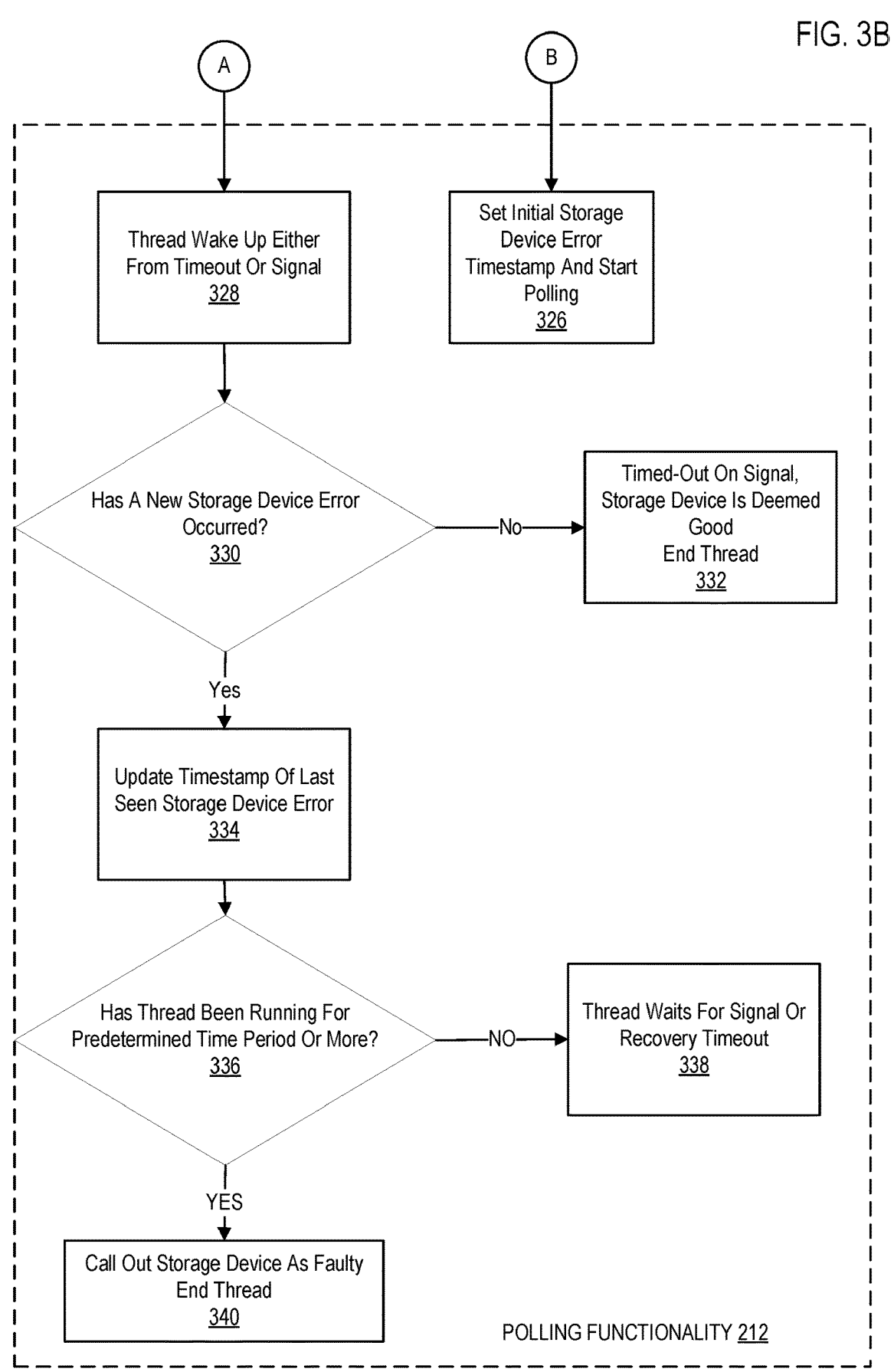

A

B

Thread Wake Up Either
From Timeout Or Signal
328

Set Initial Storage
Device Error
Timestamp And Start
Polling
326

Has A New Storage Device Error
Occurred?
330

—No—▶

Timed-Out On Signal,
Storage Device Is Deemed
Good
End Thread
332

Yes

Update Timestamp Of Last
Seen Storage Device Error
334

Has Thread Been Running For
Predetermined Time Period Or More?
336

—NO—▶

Thread Waits For Signal Or
Recovery Timeout
338

YES

Call Out Storage Device As Faulty
End Thread
340

POLLING FUNCTIONALITY 212

400

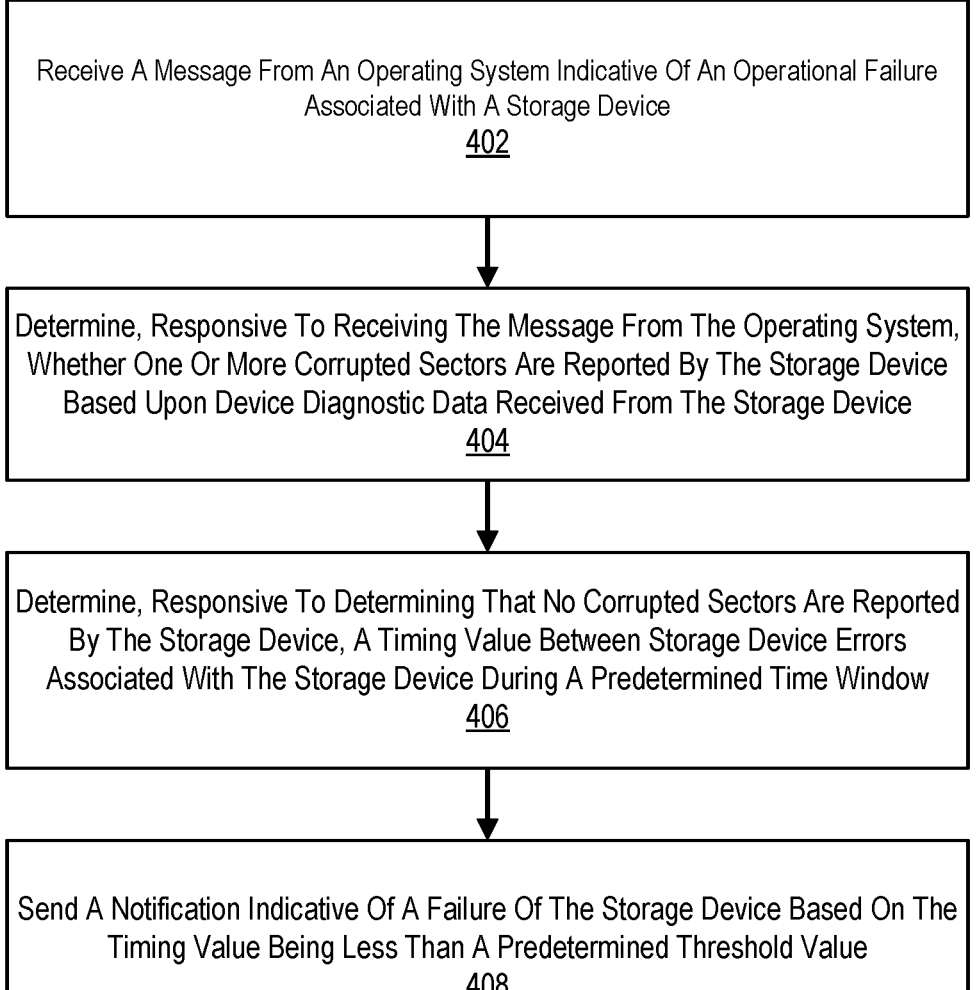

Receive A Message From An Operating System Indicative Of An Operational Failure
Associated With A Storage Device
402

Determine, Responsive To Receiving The Message From The Operating System,
Whether One Or More Corrupted Sectors Are Reported By The Storage Device
Based Upon Device Diagnostic Data Received From The Storage Device
404

Determine, Responsive To Determining That No Corrupted Sectors Are Reported
By The Storage Device, A Timing Value Between Storage Device Errors
Associated With The Storage Device During A Predetermined Time Window
406

Send A Notification Indicative Of A Failure Of The Storage Device Based On The
Timing Value Being Less Than A Predetermined Threshold Value
408

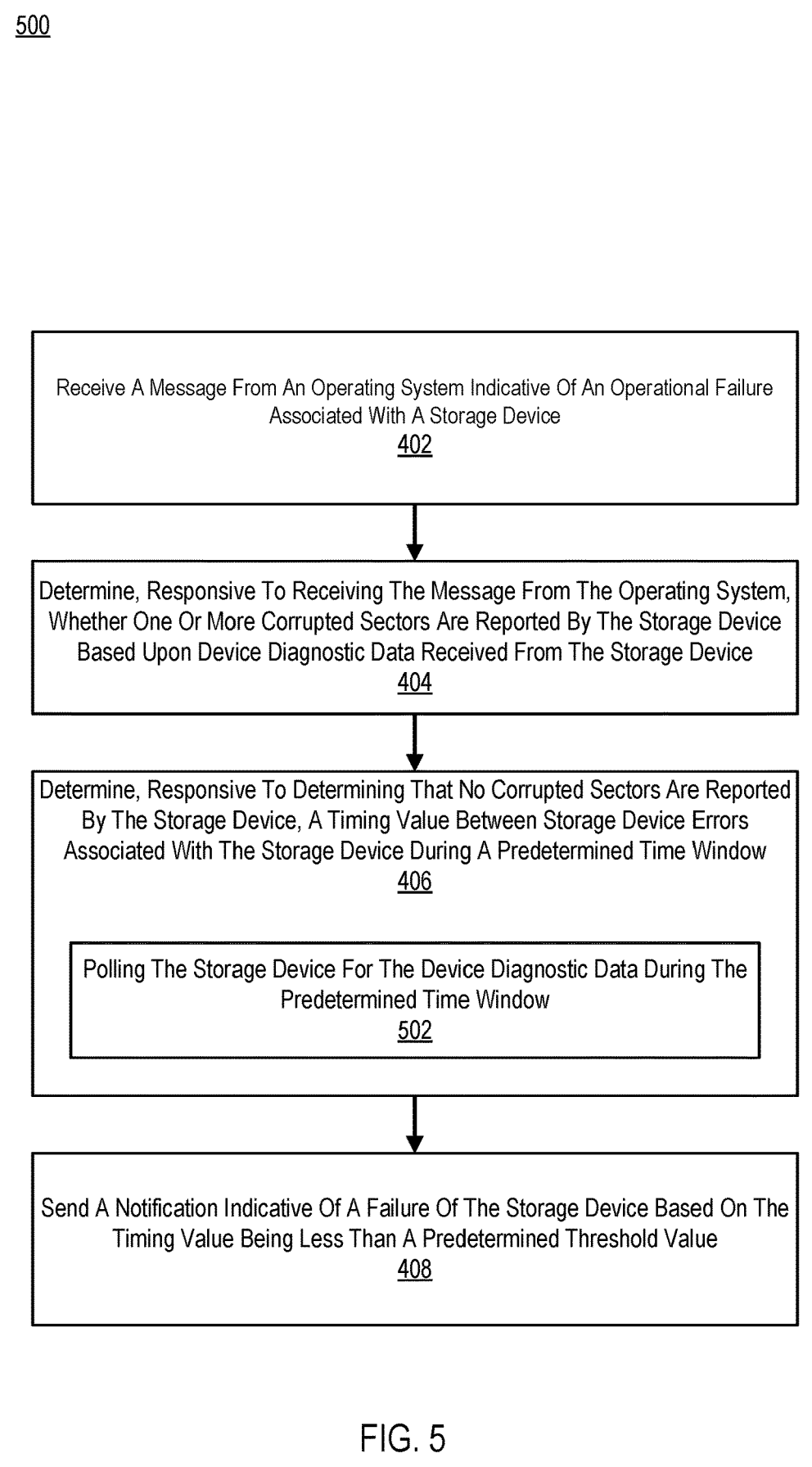

Receive A Message From An Operating System Indicative Of An Operational Failure Associated With A Storage Device
402

Determine, Responsive To Receiving The Message From The Operating System, Whether One Or More Corrupted Sectors Are Reported By The Storage Device Based Upon Device Diagnostic Data Received From The Storage Device
404

Determine, Responsive To Determining That No Corrupted Sectors Are Reported By The Storage Device, A Timing Value Between Storage Device Errors Associated With The Storage Device During A Predetermined Time Window
406

Polling The Storage Device For The Device Diagnostic Data During The Predetermined Time Window
502

Send A Notification Indicative Of A Failure Of The Storage Device Based On The Timing Value Being Less Than A Predetermined Threshold Value
408

FIG. 5

STORAGE DEVICE FAILURE VERIFICATION VIA KERNEL MESSAGE POLLING AND DEVICE DIAGNOSTIC DATA ANALYSIS

BACKGROUND

The present disclosure relates to methods, apparatus, and products for storage device failure verification via kernel message polling and device diagnostic data analysis.

SUMMARY

According to embodiments of the present disclosure, methods, apparatus and systems for storage device failure verification via kernel message polling and device diagnostic data analysis are described herein. In some aspects, storage device failure verification includes receiving a message from an operating system indicative of an operational failure associated with a storage device. The method further includes determining, responsive to receiving the message from the operating system, whether one or more corrupted sectors are reported by the storage device based upon device diagnostic data received from the storage device. The method further includes determining, responsive to determining that no corrupted sectors are reported by the storage device, a timing value between storage device errors associated with the storage device during a predetermined time window. The method further includes sending a notification indicative of a failure of the storage device based on the timing value being less than a predetermined threshold value.

BRIEF DESCRIPTION OF THE DRAWINGS

FIG. 1 sets forth an example computing environment for storage device failure verification via kernel message polling and device diagnostic data analysis according to aspects of the present disclosure.

FIGS. 3A-3B is a process flow diagram illustrating an example storage device failure verification procedure of the storage device failure verification component of FIG. 2 in accordance with embodiments of the present disclosure.

FIG. 4 is a flowchart illustrating an example method for storage device failure verification via kernel message polling and device diagnostic data analysis in accordance with embodiments of the present disclosure.

FIG. 5 is a flowchart illustrating another example method for storage device failure verification via kernel message polling and device diagnostic data analysis in accordance with embodiments of the present disclosure.

DETAILED DESCRIPTION

Figure 2:
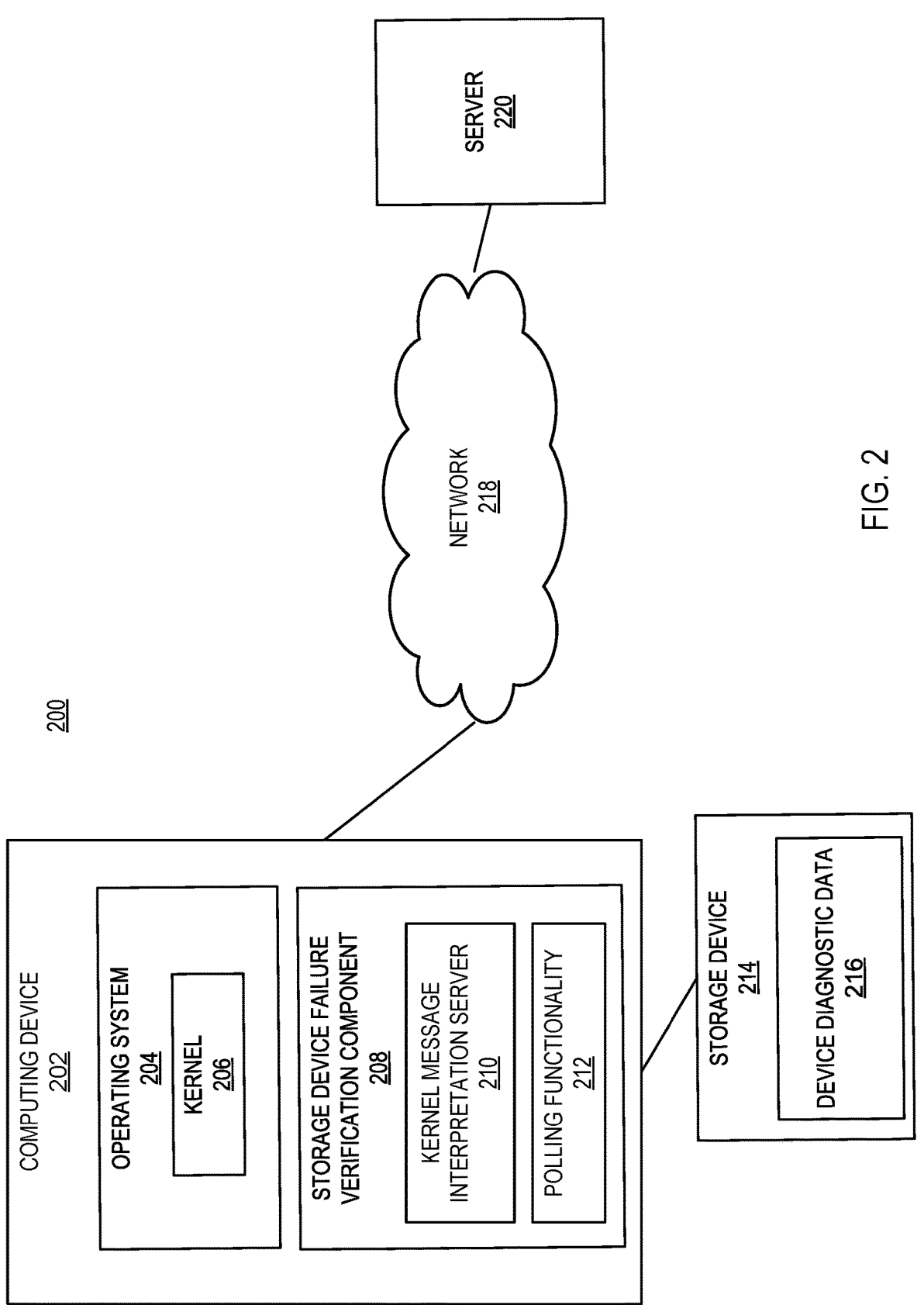
FIG. 2. sets forth an example communication system configured for storage device failure verification via kernel message polling and device diagnostic data analysis according to aspects of the present disclosure.

A typical storage system generally comprises a server and a number of storage devices, such as hard drive and/or solid state drives (SSDs), connected over a network to one or more servers or connected locally to a computing system. However, hard drives and other storage devices are subject to failures that compromise data integrity. Monitoring systems have been developed to monitor the health of storage devices and provide notification if a failure is detected. An example of such monitoring systems is Self-Monitoring, Analysis, and Reporting Technology (SMART) that provides diagnostic information regarding the health status of storage devices. However, existing systems are often subject to false positive errors which may lead to costly unnecessary replacement of the storage devices.

Existing systems for determining storage device failures are often inadequate to distinguish between false positive storage device errors and actual storage device errors. In some existing systems, firmware monitors kernel messages for storage device errors generated by the kernel. Upon detecting a storage device specific error message, firmware code may immediately determine that the storage device is corrupted, calls home the error to a computing system and/or storage system provider via a communication network, and the provider will replace the storage device in the client's computing system. The possibility of false positive errors or storage device recoveries may not currently be contemplated which leads to unnecessary costly replacement of storage device components and well as dispatch of technicians to client facilities to perform the storage device replacement.

Various embodiments described herein provide for a process for storage device failure verification via kernel message polling and device diagnostic data analysis using a multi-level (e.g., two-level) verification system to determine whether or not a storage device is truly corrupted. In an embodiment, upon detecting a kernel message signifying a storage device operational failure, analysis is performed using a device diagnostic tool, such as a SMART tool, to determine if the storage device is reporting any bad sectors. If bad sectors are reported by the storage device, the firmware assumes that the storage device is corrupted and will not recover, and the problem is reported to a server associated with the provider. If bad sectors are not reported, the firmware deploys a polling algorithm for a predetermined timeframe, referred to as a polling window. During the polling window, the firmware keeps track of the timing between storage device errors. If the timing between the storage device errors is larger than a predetermined recovery window, the firmware considers the storage device recovered. However, if the storage device errors continue through the entire polling window, the firmware determines that the storage device errors are true failures, and calls the storage device failure home to the provider. Although various embodiments are described as using a determination of whether bad sectors are reported to deploy a polling algorithm, in other embodiments other suitable storage device diagnostic data may be used. In addition, although various embodiments are described as using firmware to perform certain functions related to storage device failure verification, in other embodiments, s storage device failure verification component may be embodied, for example, in software, hardware, or a combination of software and hardware.

FIG. 1 sets forth an example computing environment according to aspects of the present disclosure. Computing environment 100 contains an example of an environment for the execution of at least some of the computer code involved in performing the various methods described herein, such as storage device failure verification component 107 configured to facilitate the obscured location verification operations described herein. This description should reveal to the reader what the inventive code does at a general level. Illustrative examples: "cloud orchestration code," "ML algorithm code," etc.] storage device failure verification component 107. In addition to storage device failure verification component 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and storage device failure verification component 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Such computer processors as well as graphic processors, accelerators, coprocessors, and the like are sometimes referred to herein as a processing device. A processing device and a memory operatively coupled to the processing device are sometimes referred to herein as an apparatus. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in storage device failure verification component 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in storage device failure verification component 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

For further explanation, FIG. 2. sets forth an example communication system configured for storage device failure verification via kernel message polling and device diagnostic data analysis according to aspects of the present disclosure. The communication system 200 of FIG. 2 includes a computing device 202. The computing device 202 includes an operating system 204 including a kernel 206. The computing device further includes a storage device failure verification component 208 configured to facilitate storage device failure verification via kernel message polling and device diagnostic data analysis in accordance with embodiments of the present disclosure. In a particular embodiment, the storage device failure verification component 208 is the storage device failure verification component 107 of FIG. 1. The storage device failure verification component 208 includes a kernel message interpretation server 210 and a polling functionality 212 as further described below with respect to FIGS. 3A-3B.

The computing device 202 is in communication with a storage device 214. The storage device 214 is configured to collect device diagnostic data 216 for providing to the kernel 206 of the operating system 204. In particular embodiments, the storage device 214 includes a hard drive disk or an SSD. The computing device is in communication with a server 220 via a network 218. In the example of FIG. 2, the server 220 is associated with a provider of one or more of the computing device 202 and storage device 214 and is configured to notifications from the computing device regarding a health status of the storage device 214 such as whether storage device 214 has experienced a failure. In a particular embodiment, the computing device 202 is the computer 101 of FIG. 1.

For further explanation, FIGS. 3A-3B is a process flow diagram illustrating an example storage device failure verification procedure of the storage device failure verification component 208 of FIG. 2 in accordance with embodiments of the present disclosure. In particular, FIG. 3A shows operations of the kernel message interpretation server 210 of the storage device failure verification component 208, and FIG. 3B shows operations of the polling functionality 212 of the storage device failure verification component 208 in accordance with embodiments of the present disclosure. Referring now to FIG. 3A, in the example embodiment, the kernel message interpretation server 210 receives a kernel message 302 from the operating system 204. The kernel message interpretation server 210 determines 304 if the kernel message is an error message. If the kernel message is not an error message, kernel message interpretation server 210 performs 306 no further operation with respect to the kernel message 302. If the kernel message is an error message, the kernel message interpretation server 210 determines 308 a type of the error. If the error is of a type other than a storage device error, the kernel message interpretation server 210 performs 310 a callout of the bad hardware indicated by the error.

If the error type is a storage device error, the kernel message interpretation server 210 determines 312 whether a polling thread is running. If no polling thread is running, kernel message interpretation server 210 runs 314 a smartctl command on the storage device. A smartctl command returns SMART diagnostic data collected by the storage device that is indicative of the health of the storage device. Although the particular example illustrated in FIGS. 3A-3B are described as using a smartctl command to collect device diagnostic data from the storage device, in other embodiments other suitable device diagnostic data collection tools are utilized. The kernel message interpretation server 210 examines 316 the smartctl results 316, and determines 318 if there are storage device errors indicated by the smartctl results. If storage device errors are indicated by the smartctl results, the kernel message interpretation server 210 calls out 320 the storage device as failed. If no storage device errors are indicated by the smartctl results, the kernel message interpretation server 210 initiates 322 the polling functionality 212 for storage device errors, and the polling functionality 212 sets 326 an initial storage device error timestamp and start polling as shown in FIG. 3B.

Referring again to FIG. 3A, if the kernel message interpretation server 210 determines 312 that a polling thread is running, the kernel message interpretation server 210 sends 324 a signal to the polling functionality 212 indicating a new storage device error as further described below with respect to FIG. 3B below.

Referring now to FIG. 3B, after receiving the signal from the kernel message interpretation server 210, the polling functionality 212 performs 328 a polling thread wake up as either a result of a timeout or in response to the signal. The polling functionality 212 determines 330 if a new storage device error has occurred. If no new storage device error has occurred, the polling functionality 212 times out 332 the signal, determines that the storage device is deemed good, and ends the thread. If the polling functionality 212 determines that a new storage device error has occurred, the polling functionality 212 updates 334 a timestamp of the last seen storage device error. The polling functionality 212 determines 336 if the thread has been running for a predetermined time period or more. In a particular embodiment, the predetermined time period is 3.5 minutes. If the thread has not been running for the predetermined time period, the thread waits 338 for a signal or recovery timeout. If the thread has been running for the predetermined time period, the polling functionality 212 calls out 340 the storage device as faulty and ends the thread.

For further explanation, FIG. 4 set forth a flowchart illustrating an example method 400 for storage device failure verification via kernel message polling and device diagnostic data analysis in accordance with embodiments of the present disclosure. In the example method 400, the storage device failure verification component 208 receives 402 a message from an operating system indicative of an operational failure associated with a storage device. In a particular embodiment, the message comprises a kernel message. In another particular embodiment, the message includes operating system diagnostic data indicative of the operational failure associated with the storage device. In a particular embodiment, the storage device comprises a hard driver or a solid state drive (SSD).

The storage device failure verification component 208 determines 404, responsive to receiving the message from the operating system, whether one or more corrupted sectors are reported by the storage device based upon device diagnostic data received from the storage device. In a particular embodiment, the diagnostic data is collected by the storage device. In another particular embodiment, the device diagnostic data comprises Self-Monitoring, Analysis and Reporting Technology (SMART) data.

The storage device failure verification component 208 determines 406, responsive to determining that no corrupted sectors are reported by the storage device, a timing value between storage device errors associated with the storage device during a predetermined time window. In a particular embodiment, the storage device errors are consecutive storage device errors. In a particular embodiment, the determining of the timing value between storage device errors associated with the storage device during the predetermined time window is performed by firmware.

The storage device failure verification component 208 sends 408 a notification indicative of a failure of the storage device based on the timing value being less than a predetermined threshold value. In a particular embodiment, the notification indicative of the failure of the storage device is sent to a server.

In an embodiment, the method 400 further includes the storage device failure verification component 208 sending an indication that the storage device has recovered based on the timing value being greater than or equal to the predetermined threshold value.

For further explanation, FIG. 5 sets forth a flowchart illustrating another example method 500 for storage device failure verification via kernel message polling and device diagnostic data analysis in accordance with embodiments of the present disclosure. The method of FIG. 5 is similar to the method of FIG. 5 except that the determining 406, responsive to determining that no corrupted sectors are reported by the storage device, a timing value between storage device errors associated with the storage device during a predetermined time window further includes the storage device failure verification component 208 polling 502 the storage device for the device diagnostic data during the predetermined time window.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for storage device failure verification, the method comprising:

receiving a message from an operating system indicative of an operational failure associated with a storage device;

based on receiving the message from the operating system, executing a command on the storage device to obtain device diagnostic data from the storage device;

determining whether one or more corrupted sectors are reported by the storage device based on the device diagnostic data;

initiating a polling thread for a predetermined time window responsive to determining that no corrupted sectors are reported by the storage device;

determining a timing value between storage device errors associated with the storage device during the predetermined time window;

terminating the polling thread after the predetermined time window; and sending a notification indicative of a failure of the storage device based on the timing value being less than a predetermined threshold value.

2. The method of claim 1, wherein determining the timing value between storage device errors associated with the storage device during the predetermined time window further comprises polling the storage device for the device diagnostic data during the predetermined time window.

3. The method of claim 1, further comprising sending an indication that the storage device has recovered based on the timing value being greater than or equal to the predetermined threshold value.

4. The method of claim 1, wherein the message comprises a kernel message.

5. The method of claim 1, wherein the message includes operating system diagnostic data indicative of the operational failure.

6. The method of claim 1, wherein the device diagnostic data is collected by the storage device.

7. The method of claim 1, wherein the device diagnostic data comprises Self-Monitoring, Analysis and Reporting Technology (SMART) data.

8. The method of claim 1, wherein the storage device errors are consecutive storage device errors.

9. The method of claim 1, wherein the notification indicative of the failure of the storage device is sent to a server.

10. The method of claim 1, wherein the determining of the timing value between storage device errors associated with the storage device during the predetermined time window is performed by firmware.

11. The method of claim 1, wherein the storage device comprises a hard drive or a solid state drive (SSD).

12. An apparatus for storage device failure verification, the apparatus comprising a computer processor and a computer memory operatively coupled to the computer processor, the computer memory having computer program instructions that, when executed by the computer processor, cause the apparatus to:

receive a message from an operating system indicative of an operational failure associated with a storage device;

based on receiving the message from the operating system, execute a command on the storage device to obtain device diagnostic data from the storage device;

determine whether one or more corrupted sectors are reported by the storage device based on the device diagnostic data;

initiate a polling thread for a predetermined time window responsive to determining that no corrupted sectors are reported by the storage device;

determine a timing value between storage device errors associated with the storage device during the predetermined time window;

terminate the polling thread after the predetermined time window; and send a notification indicative of a failure of the storage device based on the timing value being less than a predetermined threshold value.

13. The apparatus of claim 12, wherein the computer program instructions that, when executed by the computer processor, cause the apparatus to determine the timing value between storage device errors associated with the storage device during the predetermined time window further cause the apparatus to poll the storage device for the device diagnostic data during the predetermined time window.

14. The apparatus of claim 12, wherein the computer program instructions further cause the apparatus to send an indication that the storage device has recovered based on the timing value being greater than or equal to the predetermined threshold value.

15. The apparatus of claim 12, wherein the message comprises a kernel message.

16. The apparatus of claim 12, wherein the message includes operating system diagnostic data indicative of the operational failure.

17. A computer program product for storage device failure verification, the computer program product disposed upon a non-transitory computer readable storage medium, the computer program product comprising computer program instructions that, when executed, cause a computer to:

receive a message from an operating system indicative of an operational failure associated with a storage device;

based on receiving the message from the operating system, execute a command on the storage device to obtain device diagnostic data from the storage device;

determine whether one or more corrupted sectors are reported by the storage device based on the device diagnostic data;

initiate a polling thread for a predetermined time window responsive to determining that no corrupted sectors are reported by the storage device;

determine a timing value between storage device errors associated with the storage device during the predetermined time window;

terminate the polling thread after the predetermined time window; and send a notification indicative of a failure of the storage device based on the timing value being less than a predetermined threshold value.

18. The computer program product of claim 17, wherein the computer program instructions that, when executed, cause the computer to determine the timing value between storage device errors associated with the storage device during the predetermined time window further cause the computer to poll the storage device for the device diagnostic data during the predetermined time window.

19. The computer program product of claim 17, wherein the computer program instructions further cause the computer to send an indication that the storage device has recovered based on the timing value being greater than or equal to the predetermined threshold value.

20. The computer program product of claim 17, wherein the message comprises a kernel message.

* * * * *